Patented Nov. 17, 1953

2,659,689

UNITED STATES PATENT OFFICE 2,659,689

BENZOIC ESTERS

Albert A. Schreiber, Salem, N. Y., assignor to Van Dyk & Company, Inc., Belleville, N. J., a firm No Drawing. Application December 23, 1950, Serial No. 202,558

6 Claims. (Cl. 167—90)

This invention relates to benzoic esters and has particular relation to esters obtainable by reacting an amino benzoic ester with an aldose.

For the protection of the human skin from the erythema producing range of the ultraviolet rays of natural or artificial origin, that is light waves of between 2900 and 3100 Angstrom, various products have been used in the form of solutions or emulsions leaving a film of finely distributed particles of the protective substances on the skin. One type of these substances comprises the alkyl and alkylol esters of p-amino benzoic acid; the amino group of the said alkyl esters has been also alkylated to improve the stability of the compounds.

However, said alkylated amino benzoic esters show an insufficient solubility in aqueous, not inflammable solutions and the non-alkylated amino benzoic esters have the property of staining fabrics, especially those of lighter shade, a disagreeable yellow to brown color on their contact with the skin protected by such esters.

I have now found that both sufficiently stable and sufficiently soluble products having the necessary protective effect can be obtained by reacting an amino benzoic ester with an aldose in a suitable, practically anhydrous, inert solvent essentially in the presence of a small quantity of an acid reacting agent until an aldimino benzoic ester corresponding to the initial materials used is formed.

The lower alkyl esters, that is the methyl, ethyl and propyl esters of p-amino benzoic acid are suitable for the said reaction not only because they are easily available but also in view of their low molecular weight so that a maximum effect of protection by the final product can be obtained with the lowest possible amount of material. As the ester group of the p-amino benzoic esters is not involved in the present reaction, any other ester may be employed, if desired.

The aldose to be reacted with the p-amino benzoic ester may be any aldo-monose or aldo-polyose though monoses will be preferred as giving products with the lowest possible molecular weight. Accordingly, the aldose component can be glycerose, arabinose, ribose, xylose, glycose, galactose or like aldo-monoses. Naturally, the monose most easily and cheaply available, such as is glycose at present, will be preferably used in commercial production.

Solvents particularly suitable for the process of the present invention are the lower aliphatic alcohols, such as methyl, ethyl and propyl alcohol, which may have a low content of water, such as five percent or less. These solvents are preferred over other solvents of higher boiling point as they can be easily removed after the reaction. Their water content should not be higher than stated, as otherwise the reaction is liable to take a different course.

The acid reacting agent can be selected from acid reacting salts, such as ammonium chloride or sodium bisulfate, or the lower fatty acids, such as formic or acetic acid, or inorganic or other acids such as hydrochloric, phosphoric or toluene sulfonic acid; sulfuric acid in very small quantities may also be used, although, in this case, a slight discoloration may occur. The amount to be used ranges from about 0.2 to 2% of the weight of aldose employed, the smaller percentage to be employed with stronger acid agents, the larger with milder acid agents.

The reaction is carried out best by refluxing equimolecular quantities of aldose and amino benzoic ester in from 6 to 10 times their joint weight of alcohol in the presence of a small percentage of the acid reacting agent. After about 3 hours' refluxing, the reaction mixture becomes clear, and refluxing is then proceeded with for about another half hour. After neutralization of any free acid by ammonia, soda or potash, the solvent and the water formed are either completely evaporated or only the greater part thereof. In each case, solid white products are obtained on cooling which are conveniently comminuted for use. They are aldimino derivatives of the respective benzoic ester of the type also called "Schiff's bases."

If the solvent used is not practically anhydrous, it is of advantage to employ a small excess of aldose, such as about 1% excess of the stoichiometrical quantity. In all cases, the reaction mixture must show a definite acid reaction to obtain the desired product. The reaction proceeds then according to the equation:

$$R-C\overset{O}{\underset{H}{\diagdown}}H + \overset{H}{\underset{H}{\diagdown}}N-C_6H_4-COOR_1 = R-CH=N-C_6H_4-COOR_1 + H_2O$$

in which R—CH= denotes the radical of the aldose employed and $R_1$ the alcohol group of the amino benzoic ester used.

The products are colorless substances usually occurring in the form of microcrystalline aggregates which can be recrystallized from lower aliphatic alcohols.

*Example 1*

165 parts by weight of p-amino benzoic ethyl ester are dissolved while warming in 1320 parts by weight of ethanol containing 5% of water, and 200 parts by weight of glucose and 1 part by weight of acetic acid are added while stirring. The reaction mixture is heated to boiling under reflux until a clear solution is formed, e. g. for about 3½ hours. After refluxing for another 15 minutes and then cooling to about 40° C., the reaction product is neutralized with ammonia and evaporated to dryness. The white solid substance thus obtained is recrystallized from ethanol and has then a melting point of 183° C., and is soluble in lower alcohols, in dilute, for example 50% aqueous ethanol, or in 50% aqueous acetone.

*Example 2*

The reaction components described in Example 1 are reacted in a manner substantially identical with that described in Example 1, but in the presence of 1320 parts by weight of methanol instead of ethanol and using 1 part by weight of phosphoric acid as acid reacting agent.

The product thus obtained is identical with the product of Example 1.

*Example 3*

200 parts by weight of glucose are mixed with 150 parts by weight of p-amino benzoic methyl ester and 1320 parts by weight of methanol containing 3% of water and 1 part by weight of acetic acid used as the acid reacting agent. This reaction mixture is heated to boiling under reflux for about 3½ hours. After cooling, the reaction product is neutralized with potash and evaporated to dryness. The white solid substance thus obtained is recrystallized from methanol and has then a melting point of 187° C., and is soluble in lower alcohols, in dilute, for example 50% aqueous methanol, or in 50% aqueous acetone.

*Example 4*

150 parts by weight of xylose are mixed with 165 parts by weight of p-amino benzoic ethyl ester and 1320 parts by weight of ethanol containing 3% of water and 1 part by weight of acetic acid used as the acid reacting agent. This reaction mixture is heated to boiling under reflux for about 3½ hours. After cooling, the reaction product is neutralized with ammonia and evaporated to dryness. The white solid substance thus obtained is recrystallized from ethanol and has then a melting point of 110° C. and is soluble in lower alcohols, in dilute, for example 50% aqueous ethanol, or in 50% aqueous acetone.

*Example 5*

198 parts by weight of galactose are mixed with 179 parts by weight of p-amino benzoic propyl ester and 1320 parts by weight of ethanol containing 2% of water and 1 part by weight of sodium bisulfate used as the acid reacting agent. The mixture is heated to boiling under reflux for about 4 hours. After cooling, the reaction product is neutralized with soda and evaporated to dryness. A white solid microcrystalline substance is thus obtained which is recrystallized from methanol and has a melting point of 133°–134° C. It is soluble in lower alcohols, such as ethanol and methanol, in 50% aqueous ethanol and in 50% aqueous acetone.

The products obtained according to my present invention are used in skin-protecting preparation, often called sun screens. They have the additional advantage that by treatment with alkali, such as an alkaline reacting laundry soap, they are converted into compounds which are more soluble in water than the "Schiff's bases" and rinsed out from fabrics without difficulty.

*Example 6*

In order to obtain a suntan lotion, the following ingredients are mixed:

| | Parts by weight |
|---|---|
| Aldimino derivative obtained according to one of Examples 1–5 | 2 |
| Ethyl alcohol | 44 |
| Distilled water | 44 |
| Perfume | 0.5 |

The above ingredients are mixed by stirring until a solution is formed. The latter is allowed to stand 24 hours and is then filtered.

*Example 7*

In order to obtain a suntan cream, the following mixtures (A) and (B) are first prepared:

A

| | Parts by weight |
|---|---|
| Ethylene glycol monostearate | 20 |
| Stearic acid | 10 |
| Propylene glycol | 10 |
| Aldimino derivative obtained according to one of Examples 1–5 | 6 |
| Mineral oil (light) | 5 |

B

| | Parts by weight |
|---|---|
| Water | 150 |
| Borax | 0.5 |
| Sodium lauryl sulfate | 0.5 |

Mixtures (A) and (B) are heated to about 80° C. (B) is then added to (A) under stirring to a homogeneous mixture, until cooled to about 50° C. 0.5 part by weight of perfume is then added and the product is subjected to further cooling.

It will be understood that my invention is not limited to the specific substances, steps, etc., described above and can be carried out with various modifications without departing from the scope of the invention as defined in the appended claims.

What is claimed is:

1. A p-aldimino benzoic ester of the general formula

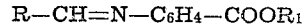

$$R-CH=N-C_6H_4-COOR_1$$

wherein R—CH= denotes an aldo-monose radical and $R_1$ denotes a lower alkyl group.

2. A benzoic ester of the formula according to claim 1, in which R—CH= stands for a glucose radical.

3. A benzoic ester of the formula according to claim 1, in which R—CH= stands for a glucose radical and $R_1$ stands for a methyl group.

4. A benzoic ester of the formula according to claim 1, in which R—CH= stands for a glucose radical and $R_1$ stands for an ethyl group.

5. A composition for protecting the human skin from erythema producing rays, said composition consisting of the dispersion in a water-soluble organic solvent of a p-aldimino benzoic ester compound of the formula

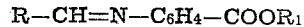

$$R-CH=N-C_6H_4-COOR_1$$

wherein R—CH= denotes an aldo-monose radical and $R_1$ denotes a lower group.

6. A composition for protecting the human skin from erythema producing rays, said composition comprising a solution in an organic solvent of a p-aldimino benzoic ester compound of the formula $$R-CH=N-C_6H_4-COOR_1$$

wherein R—CH= denotes an aldo-monose radical and $R_1$ denotes a lower alkyl group, said solvent being selected from the group consisting of lower alcohols, dilute aqueous ethanol, dilute aqueous methanol and dilute aqueous acetone.

ALBERT A. SCHREIBER.

References Cited in the file of this patent

UNITED STATES PATENTS

| Number | Name | Date |
|---|---|---|
| 1,530,121 | Hooper | Mar. 17, 1925 |
| 2,193,433 | Salzberg | Mar. 12, 1940 |
| 2,250,999 | Pasternack et al. | July 29, 1941 |
| 2,287,071 | Tillitson | June 23, 1942 |
| 2,327,899 | Isermann | Aug. 24, 1943 |
| 2,342,957 | Moore | Feb. 29, 1944 |
| 2,374,791 | Tillitson | May 1, 1945 |
| 2,384,102 | Lee | Sept. 4, 1945 |
| 2,426,011 | Friedman et al. | Aug. 9, 1947 |

FOREIGN PATENTS

| Number | Country | Date |
|---|---|---|
| 20,333 | Great Britain | 1897 |
| 526,747 | Great Britain | Sept. 25, 1940 |

OTHER REFERENCES

Hackh's Chemical Dictionary, 3d edition, 1944, page 166.

Pigman: Carbohydrate Chemistry (1948), pages 375 to 379.

Gilman: Organic Chemistry, volume 1 (1943), page 659.

Riegel: Journal of the American Chemical Society, volume 51, pages 484 to 492, February 1929.

Berger et al.: Journal Org. Chem., volume 11, Number 1, pages 75 to 82.

De Navarre: Chemistry and Mfg. of Cosmetics (1941), pages 592, 595.